May 22, 1951             C. P. WEST             2,554,163
WATER SOFTENER
Filed Oct. 14, 1946
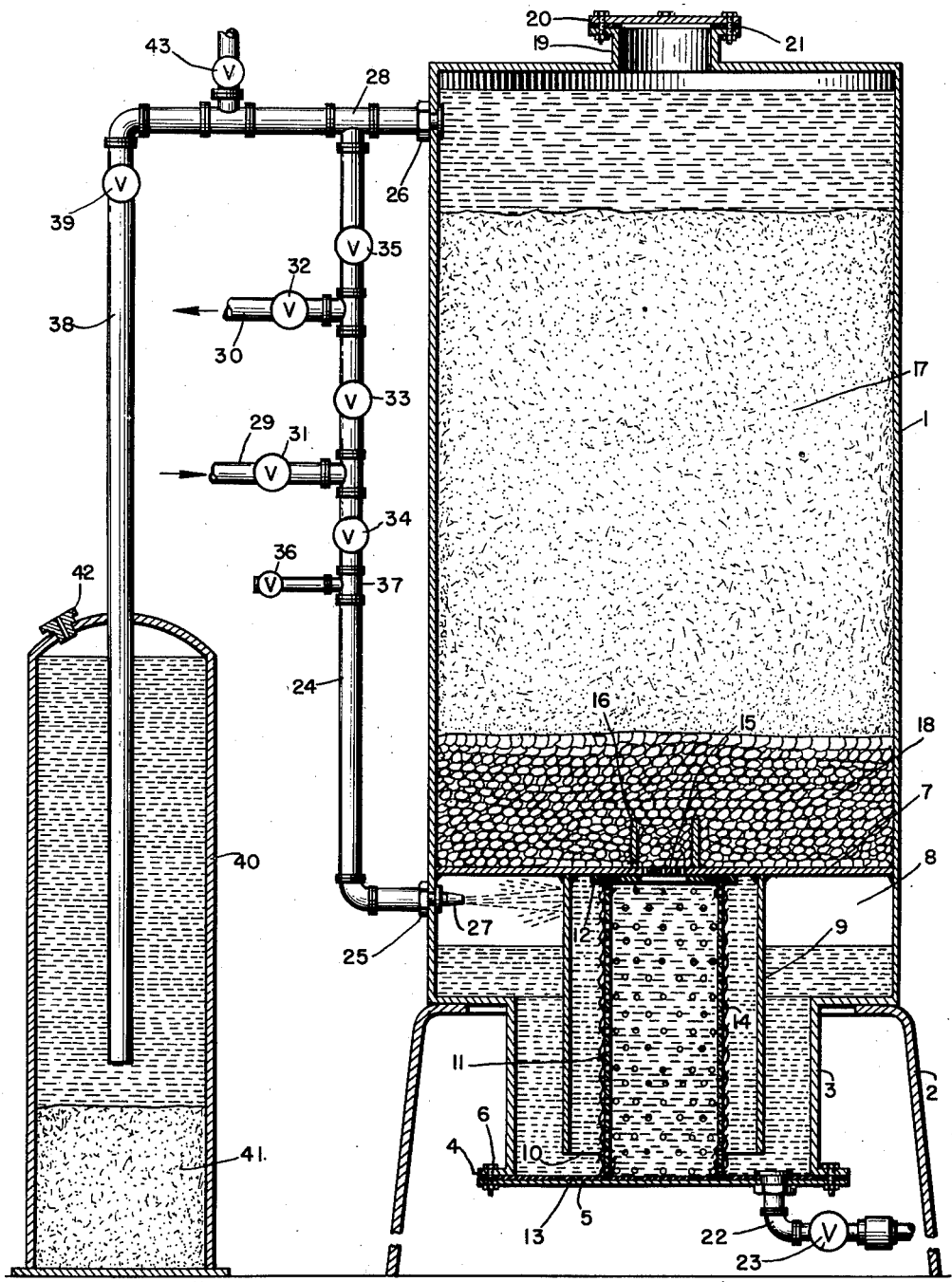
INVENTOR
CHARLES P. WEST
BY
ATTORNEYS Patented May 22, 1951

2,554,163

UNITED STATES PATENT OFFICE 2,554,163

WATER SOFTENER

Charles P. West, Detroit, Mich.

Application October 14, 1946, Serial No. 703,241

1 Claim. (Cl. 210—24)

This invention relates to water softener apparatus and particularly to base exchange or zeolite water softener devices which embody iron oxidizing and sediment filtering means in a unitary structure.

The main objects of this invention are to provide an improved base exchange water softener apparatus; to provide a device of simplified construction and operation; to provide an improved built-in iron and sediment filter for base exchange water softeners; to provide such a means that can be readily disassembled for cleansing or renewal of the filter medium; to provide a water softener having improved means for aerating the water to be softened; to provide an improved zeolite water softener that can be more easily flushed to remove accumulated impurities; to provide such a device arranged for quick and easy regeneration of the zeolite or base exchange water softening material; and to provide an improved upflow water softener construction which obviates channeling of the water through the water softening material.

A specific embodiment of this invention is shown in the accompanying drawing in which the figure is a partially sectioned side elevation of the improved apparatus showing its construction and the arrangement of its several elements.

In the form shown the improved water softening apparatus comprises a hollow, cylindrical shell or body member 1, supported in an upright position by a suitable stand or base 2 through which access may be had to the lower end for a purpose which will be described. The lower end 3 of the shell or body 1 is of reduced diameter and extends into the base or stand 2 where its end is provided with a radial flange 4 and a closure plate 5, removably secured to the flange by suitable bolts 6.

Within the body 1, and spaced above the reduced lower end portion 3, is a partition plate 7 which is welded, or otherwise suitably secured to the body shell so as to physically divide the body into air-tight upper and lower chambers. The upper chamber contains the water softening medium or base exchange material which is supported on the partition plate 7, and the lower chamber contains the iron and sediment filtering means. The lower chamber also includes an air-bound spray chamber 8 in its upper portion and for that reason the joint between the partition 7 and the inner side wall of the body 1 must be air tight.

As shown, a cylindrical baffle 9 is disposed concentrically within the lower chamber and is fastened to the partition plate 7 so as to hang or depend therefrom, the joint being made air tight as by welding. The baffle 9 extends downwardly into the reduced body portion 3 and terminates, in an open end 10, a short distance above the bottom closure plate 5.

A hollow perforated cylinder or filter screen 11, of lesser diameter than the baffle 9 so as to be spaced therefrom, is disposed concentrically within the baffle 9 and is suitably clamped between the closure plate 5 and the partition 7, an annular gasket 12 being preferably provided at the upper end of the cylinder 11 and the lower end being sealed by means of a gasket 13 which extends from edge to edge of the closure plate 5. A suitable filtering medium 14, which may be a filter cloth or filter paper, is wrapped around the cylinder 11 so as to completely cover the cylinder from end to end and, if desired, the upper and lower margins of the filter medium may be turned over the respective edges of the cylinder so as to be firmly clamped and held against the gaskets 12 and 13.

As shown, the partition 7 is centrally perforated as at 15, in that area within the interior of the filter cylinder, to provide a passage for water from the filter cylinder into the upper chamber of the body or shell 1, and an upstanding collar 16 is provided on the upper surface of the partition to surround the perforated or passage area thereof. The purpose of the collar 16 is to direct the flow of filtered water, passing through the perforated passage 15, centrally upward into the bed of water softening material in the upper body chamber. Thus the water is prevented from passing along the partition 7 to the side wall of the shell 1 where it would then flow upward along the shell and form flow channels in the water softening material, instead of filtering its way through the entire body of the material.

The water softening material 17 may be any one of several base exchange substances, such as the zeolites now in common use, and substantially fills the upper body portion of the apparatus. Preferably a primary bed 18 of coarse zeolite, washed gravel, or crushed rock is first installed in the apparatus, which bed covers the partition 7 and the collar 16 sufficiently to allow a gradual lateral dispersal of the filtered water before it contacts the fine grain zeolite or base exchange material 17. The water softening material or fine grain zeolite 17 usually used for softening purposes, is then installed on top of the bed 18.

The gravel or rock bed 18 and the water softening material 17 are introduced into the upper body portion of the shell 1 through a suitable flanged opening 19 provided in the top of the shell, and this opening is then sealed by means of a closure plate 20 and a suitable gasket 21 which are bolted onto the flange.

For drainage flushing and cleansing purposes a drain line 22 is installed in the bottom of the lower body portion 3 and this drain is provided with a suitable valve 23 for opening and closing the drain line, which leads to waste.

As shown, a system of piping is provided to supply hard water to the apparatus for softening; to remove the filtered and softened water; to permit back-washing of the apparatus under pressure or by gravity; and to introduce a regenerating agent for the base exchange material.

In the form shown such piping comprises a riser 24 connected between a water inlet connection 25, located in the side of the body or shell 1 in the upper part of the bottom chamber, and a soft water outlet connection 26 located at the top of the body 1. The lower end of the riser 24 terminates in a nozzle 27 extending into the spray or air chamber 8, which nozzle is directed toward or against the baffle 9; and the upper end of the riser 24 is connected to the soft water outlet connection 26 through a T-fitting 28.

A hard water supply line 29 is connected to the riser 24, intermediate its ends, through a suitable T-fitting and a soft water discharge line 30 is connected to the riser 24 through a T-fitting located at a point above the hard water supply line 29. Valves 31 and 32 are provided in the supply line 29 and the discharge line 30 respectively, and a valve 33 is located in the riser between the T-connections of the lines 29 and 30. Valves 34 and 35 are also disposed in the riser 24 and are located respectively below the T-connection for the supply line 29 and above the T-connection for the discharge line 30. The purpose of these several valves in the riser 24 will be explained hereafter in the description of the operation of the apparatus.

A suitably valved air inlet for the riser 24 is also provided, below the valve 34, and in the form shown, such air inlet comprises a valve 36 connected to a T-fitting 37 located in the riser 24, the valve 36 being normally closed and being opened only when an air supply for the air chamber 8 is required as will be explained.

As shown the uppermost T-fitting 28 is also connected to a line 38 through a valve 39 which leads into a brine supply reservoir 40. This brine supply reservoir comprises a tank containing a quantity of salt 41 and to which water may be supplied from the water softener through the valve 39 and the pipe 38. The brine thus formed in the tank 40 may be used for regeneration of the base exchange material 17 in the well-known manner, as will be explained. The tank 40 is provided with a capped opening 42 for the introduction of the salt, which capped opening is provided with an air vent, as shown.

An air inlet valve 43, connected through a suitable T-fitting, is also provided in the upper horizontal run of the pipe 38. The valve 43 is normally closed and is used when it is desired to back-wash the water softening apparatus by the gravity method.

In the normal operation of the herein-described apparatus the valves 23, 33, 36, 39 and 43 will be closed and the remaining valves will be open. The hard water will thus be supplied to the apparatus through the supply line 29, the valves 31 and 34, and the inlet nozzle 27. This water, being under some pressure, will be discharged as a spray through the nozzle 27 and against the baffle plate 9. As the water continues to flow it will fill the lower section 3 of the apparatus and its level will rise until the air contained in the lower chamber 3 is compressed into the upper portion of the chamber between the chamber wall and the baffle 9, which upper portion comprises the air-bound spray chamber 8. The incoming water will then fill the interior of the baffle 9 and, working its way through the filter medium 14 and the perforated cylinder 11, the water will pass upwardly through the perforated passage portion 15 of the partition 7 and thence into the upper chamber of the body 1. The water entering the upper chamber is thus filtered and all foreign insoluble substances will have been trapped by the filter medium 14, such foreign substances comprising mainly sediment and oxidized or insoluble iron salts.

Upon entering the upper chamber of the apparatus, the water is directed upwardly by the projecting collar 16, which surrounds the central passage in the partition 7, and into the gravel or crushed sock 18 which will cause the water to be dispersed substantially uniformly into the zeolite bed 17. In working its way upwardly through the zeolite bed, the hardness of the water will be removed through the action of the zeolite and a supply of filtered soft water will form at the top of the apparatus above the zeolite bed. Such water will then pass through the outlet 26 and the valves 35 and 32 into the soft water discharge line 30.

It will now be seen that the hard water supplied to the apparatus through the inlet 25 will be projected against the baffle 9 in the form of a spray, the particles of which will be further broken up through impingement upon the baffle 9. Thus the incoming water is thoroughly aerated in the air chamber 8 and the soluble iron salts, or the like, in the water will become oxidized so as to form an insoluble precipitate. Such iron precipitate is then removed, together with any sediment in the water, by means of the filter medium 14, which in the present apparatus is so arranged as to provide a very large filtering area. Removal of the iron from the incoming water is essential as otherwise the iron will tend to deposit upon the zeolite particles in the upper or softening chamber of the apparatus and ruin the zeolite for further use.

Since the air supply in the air chamber 8 will tend to become depleted because of absorption by the water passing through the lower or filter chamber of the apparatus, it will occasionally be necessary to introduce a fresh supply of air. This is accomplished by closing the valves 34 and 35 and then opening the valve 23 which leads to waste, thus allowing the water contained in the filter chamber to drain out of the apparatus. As soon as the valve 23 is opened, the air valve 36 is opened and as the water drops in the filter chamber, a new supply of air will be drawn into the filter chamber through the riser 24 and the nozzle 27.

Suitable means such as a sight glass, or other water level indicator, not shown, may be provided on the side of the body 1 adjacent the upper portion of the filter chamber to indicate when a sufficient supply of air has been introduced into the filter chamber, at which time the valves 23 and 36 are closed. The valves 34 and 35 may then be opened and normal operation of the apparatus resumed.

Occasionally it will be necessary to cleanse the filter chamber of accumulated sediment and foreign matter and this is accomplished by back-washing the apparatus through the drain valve 23. Such back-washing may be done by pressure or by gravity, as may be desired.

When back-washing the apparatus under pressure, the valves 32 and 34 are closed and the valves 23 and 33 are opened. Water under pressure thus passes from the supply line 29 through the valves 31, 33 and 35 into the upper part of the softening chamber from where the water is forced downwardly through the zeolite bed 17 and through the perforated portion 15 of the partition 7 into the interior of the filter screen or perforated cylinder 11. This water, being under pressure, then forces its way through the filter medium 14, thereby washing or flushing off any accumulated foreign matter which is thus carried to the bottom of the apparatus and flushed away to waste through the drain line 22 and the drain valve 23. After a suitable period of flushing, the apparatus is returned to normal operation by closing the drain valve 23 and the valve 33 and opening valves 32 and 34.

For gravity back-washing or flushing of the apparatus, the valves 31, 34 and 35 are closed, then the drain valve 23 and the air inlet valve 43 are opened which allows the water within the apparatus to drain by gravity through the drain line 22. During such drainage of the water in the apparatus, sediment and accumulated foreign matter in the filter chamber will be flushed away through the drain line 22. After such flushing, the apparatus is placed in normal operation by closing the valves 23 and 43 and opening the valves 31, 34 and 35, valve 32 having remained open and valve 33 having remained closed during the gravity back-washing process.

Periodically it will be necessary to regenerate the zeolite contained in the water softening chamber and such regeneration is accomplished by filling the apparatus with a brine solution and then after a suitable period, draining the brine solution. As is well known, the brine has the property of absorbing the minerals deposited on the zeolite during the water softening process.

In the arrangement shown the brine solution is introduced into the water softening and filtering apparatus by syphoning the brine from a brine supply tank 40. This is done by first closing the valves 31, 32, 33, 34 and 35 and then opening the valves 23 and 39. The water draining through the outlet pipe 22 will cause the brine in the tank 40 to be syphoned over into the softening chamber of the apparatus.

After the zeolite in the apparatus has been treated with brine, the valve 39 may be closed and the valves 31, 33 and 35 opened so as to flush the brine from the apparatus. After flushing the valve 33 is closed and, when the apparatus is drained, the valve 23 is closed. The valves 31, 32 and 34 are then opened which places the apparatus again in normal operation.

To assure complete drainage and flushing of the zeolite-regenerating brine from the upper chamber, the collar 16 is provided with suitable drain openings at its base. These openings are small enough to prevent the incoming water, in normal operation, from entering the upper chamber below the top of the collar 16 fast enough to cause any channeling in the zeolite bed and the function of the collar is thus not impaired.

The main advantages of this invention reside in the simple and compact unitary construction of the apparatus whereby the water supply is thoroughly filtered to remove iron and sediment and then softened so that a constant supply of filtered softened water may be obtained from a single device occupying a minimum amount of space. Other advantages are to be found in the construction and arrangement of the filtering section of the apparatus whereby the apparatus may be quickly flushed of any accumulation of foreign solids and the filter section can be readily disassembled to inspect or renew the filter medium 14 whenever such may appear to be necessary.

Still further advantages will be found in the arrangement whereby the water entering the apparatus is thoroughly and efficiently aerated by means of a spray impinging on a baffle in an air chamber which is normally under pressure, thus assuring maximum efficiency of air and water contact whereby iron in solution in the water will be quickly oxidized and transformed to insoluble filterable solids. Another advantage of this invention resides in the improved filtering arrangement for up-flow zeolite water softeners and in the construction whereby channeling of the water through the zeolite bed is obviated, thus maintaining a maximum efficiency of the water softening process.

It is to be understood that the particular arrangement of valves and piping shown may be changed to suit local requirements or individual desires, the particular piping and valve arrangement, externally of the filtering and softening apparatus, being no part of the present invention.

Although but one specific embodiment of this invention is herein shown and described, it will be understood that details of the construction shown may be altered or omitted without departing from the spirit of this invention as defined by the following claim.

I claim:

A base-exchange water softener comprising a closed hollow upright body having a transverse partition dividing said body into an upper chamber and an air-tight lower chamber, said partition having a central passage connecting said chambers, a filter screen in said lower chamber surrounding the lower side of said passage and extending from said partition to the bottom of said lower chamber, a collar surrounding the upper side of said passage and extending into said upper chamber, a baffle spaced from and surrounding said filter screen, said baffle having an air-tight connection with said partition and depending therefrom with its free end spaced from the bottom of said lower chamber, a water inlet connection in the upper part of said lower chamber arranged to impinge incoming water against the outer side of said baffle, means to introduce air into said lower chamber on the outside of said baffle, and a soft water outlet connection in the upper portion of said upper chamber.

CHARLES P. WEST.

REFERENCES CITED

The following references are of record in the file of this patent:

UNITED STATES PATENTS

| Number | Name | Date |
|---|---|---|
| 1,676,891 | Dunkelberg | July 10, 1928 |
| 1,704,051 | McGill | Mar. 5, 1929 |
| 1,747,470 | Duden | Feb. 18, 1930 |
| 2,021,919 | Montgomery et al. | Nov. 26, 1935 |
| 2,176,549 | Smith | Oct. 17, 1939 |
| 2,376,543 | Lawlor | May 22, 1945 |
| 2,383,302 | Feinauer et al. | Aug. 21, 1945 |
| 2,405,838 | Lawson et al. | Aug. 13, 1946 |